United States Patent
Oike (10) Patent No.: US 10,928,250 B2
(45) Date of Patent: Feb. 23, 2021

(54) PROJECTOR, COLOR CORRECTION SYSTEM, AND CONTROL METHOD FOR PROJECTOR

(71) Applicant: SEIKO EPSON CORPORATION, Tokyo (JP)

(72) Inventor: Takumi Oike, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/555,041

(22) Filed: Aug. 29, 2019

(65) Prior Publication Data

US 2020/0072672 A1    Mar. 5, 2020

(30) Foreign Application Priority Data

Aug. 30, 2018 (JP) .................... 2018-161459

(51) Int. Cl.
G01J 3/52     (2006.01)
G09G 5/06     (2006.01)
G03B 21/14    (2006.01)

(52) U.S. Cl.
CPC .............. *G01J 3/52* (2013.01); *G03B 21/147* (2013.01); *G09G 5/06* (2013.01)

(58) Field of Classification Search
CPC ............ G01J 3/52; G03B 21/147; G09G 5/06
See application file for complete search history.

(56) References Cited

U.S. PATENT DOCUMENTS

| 5,479,524 A | 12/1995 | Farrell et al. |
| 5,614,925 A | 3/1997 | Braudaway et al. |
| 7,314,283 B2 * | 1/2008 | Tsukada ............ H04N 5/44513 345/590 |
| 2010/0225887 A1 | 9/2010 | Sato et al. |

FOREIGN PATENT DOCUMENTS

| JP | H06-208360 A | 7/1994 |
| JP | H07-220086 A | 8/1995 |
| JP | 2003-42848 A | 2/2003 |
| JP | 2010-206584 A | 9/2010 |
| JP | 2012-145372 A | 8/2012 |

\* cited by examiner

*Primary Examiner* — Jamil Ahmed
(74) *Attorney, Agent, or Firm* — Dority & Manning, PA (57) ABSTRACT

A projector includes a measurement unit, a correction parameter generation unit, and an image processing unit. The measurement unit measures a color of an image formed on a projection surface in terms of a plurality of colors constituting an RGB color system and at least one color constituting an XYZ color system. The correction parameter generation unit generates a correction parameter based on a conversion value and a second measurement value of the color, which is measured by the measurement unit among the colors constituting the XYZ color system. The conversion value is obtained by converting a first measurement value of the color in the RGB color system, which is measured by the measurement unit, into the color in the XYZ color system. The image processing unit corrects image light with the correction parameter.

8 Claims, 8 Drawing Sheets

| PROJECTION LIGHT | MEASUREMENT VALUE | CONVERSION VALUE | AIMED VALUE |
|---|---|---|---|
| R LIGHT | $(Rr1, Gr1, Br1), Zr1$ | $(Xr1, Yr1, Z'r1)$ | $(Xr0, Yr0, Zr0)$ |
| G LIGHT | $(Rg1, Gg1, Bg1), Zg1$ | $(Xg1, Yg1, Z'g1)$ | $(Xg0, Yg0, Zg0)$ |
| B LIGHT | $(Rb1, Gb1, Bb1), Zb1$ | $(Xb1, Yb1, Z'b1)$ | $(Xb0, Yb0, Zb0)$ |

SPECTRAL WAVELENGTH CHARACTERISTICS

PROJECTOR, COLOR CORRECTION SYSTEM, AND CONTROL METHOD FOR PROJECTOR

The present application is based on, and claims priority from JP Application Serial Number 2018-161459, filed Aug. 30, 2018, the disclosure of which is hereby incorporated by reference herein in its entirety.

BACKGROUND

1. Technical Field

The present disclosure relates to a projector, a color correction system, and a control method for the projector.

2. Related Art

In the related art, a projector measures the color of image light and adjusts the color of the image light based on a result obtained by the color measurement. For example, JP-A-2012-145372 discloses an image forming apparatus that includes a color measuring device and adjusts an image forming condition of an output image based on a colorimetric value of the color measuring device.

SUMMARY

An advantage of some aspects of the present disclosure is to measure a color of an image with high accuracy and to perform color correction of image light.

An aspect of the present disclosure is directed to a projector that projects image light onto a projection surface based on image data and includes a measurement unit that measures a color of an image formed on the projection surface by the image light, in terms of a plurality of colors constituting a first color system and at least one of colors constituting a second color system, a correction parameter generation unit that generates a correction parameter based on a conversion value and a second measurement value of the color, which is measured by the measurement unit among the colors constituting the second color system, the conversion value being obtained by converting a first measurement value of the color in the first color system, which is measured by the measurement unit, into the color in the second color system, and a correction processing unit that corrects the image light with the correction parameter.

In the projector, the measurement unit may include a light receiving element and an optical filter that changes light receiving characteristics of the light receiving element. Light which is not transmitted through the optical filter may be received by the light receiving element, and the first measurement value of the color constituting the first color system may be output. Light transmitted through the optical filter may be received by the light receiving element, and the second measurement value of the color constituting the second color system may be output.

The projector may further include a solid light source, a light source optical system that generates another color light from color light emitted by the solid light source, and an optical modulation unit that modulates the other color light generated by the light source optical system and the color light emitted by the solid light source, so as to generate the image light including light of the colors constituting the first color system.

In the projector, the optical filter may change light receiving characteristics of the light receiving element in a wavelength range of the color light emitted by the solid light source.

In the projector, the light source optical system may obtain color light having a predetermined color by causing the color light emitted by the solid light source to abut against a phosphor, and generate the other color light by spectrally dividing the obtained color light having the predetermined color.

In the projector, the first color system may be an RGB color system, the second color system may be an XYZ color system, and the measurement unit may output a measurement value of each color of R, G, and B constituting the RGB color system and output a measurement value of at least one color of X, Y, and Z constituting the XYZ color system.

In the projector, the first color system may be an RGB color system, the second color system may be an XYZ color system, and the measurement unit may output a measurement value of each color of R and G constituting the RGB color system and Z constituting the XYZ color system.

Another aspect of the present disclosure is directed to a color correction system including a projector including a projection unit that projects image light onto a projection surface based on image data, and a measurement unit that measures a color of the image light forming an image on the projection surface, in terms of a plurality of colors constituting a first color system and at least one of colors constituting a second color system, and a correction parameter generation device that generates a correction parameter based on a conversion value and a second measurement value of the color, which is measured by the measurement unit among the colors constituting the second color system, the conversion value being obtained by converting a first measurement value of the color in the first color system, which is measured by the measurement unit, into the color in the second color system. The projector includes a correction processing unit that corrects the image light with the correction parameter.

Still another aspect of the present disclosure is directed to a control method for a projector that projects image light onto a projection surface based on image data. The method includes measuring a color of an image formed on the projection surface by the image light in terms of a plurality of colors constituting a first color system and at least one of colors constituting a second color system, by a measurement unit, generating a correction parameter based on a conversion value and a second measurement value of the color, which is measured by the measurement unit among the colors constituting the second color system, the conversion value being obtained by converting a first measurement value of the color in the first color system into the color in the second color system, and correcting the image light with the correction parameter.

DESCRIPTION OF EXEMPLARY EMBODIMENTS

Figure 1:
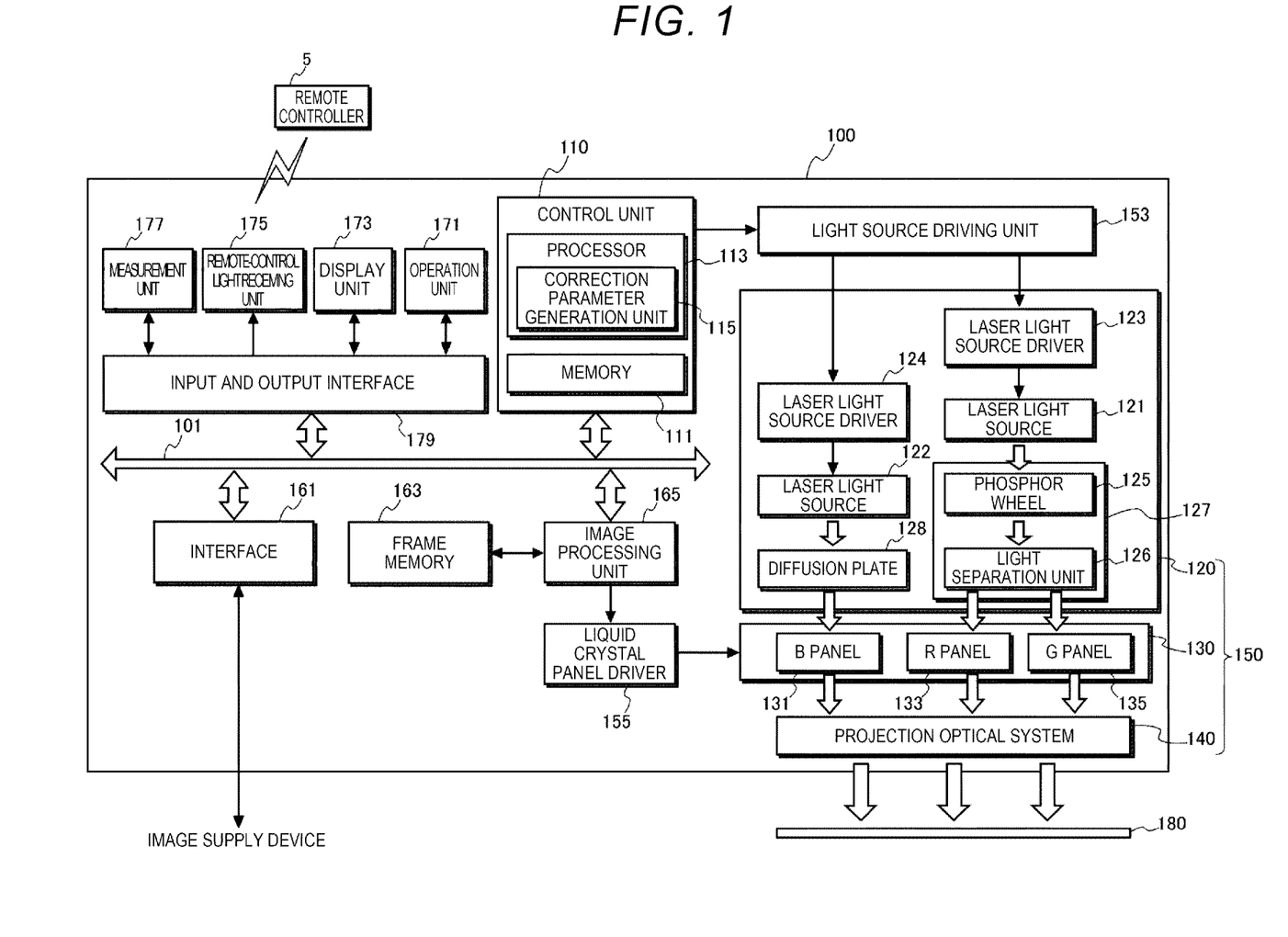
FIG. 1 is a configuration diagram illustrating a projector.

Hereinafter, embodiments of the present disclosure will be described with reference to the accompanying drawings. FIG. 1 is a configuration diagram schematically illustrating a configuration of a projector 100.

The projector 100 includes an image projection system, an image processing system, and a control unit 110. The image projection system includes, for example, a projection unit 150 that generates image light as an optical image and projects the image light onto a projection surface 180. The image processing system includes, for example, an image processing unit 165 that electrically processes image data as a source of the optical image. The control unit 110 controls the above components.

The projection unit 150 includes a light source unit 120, an optical modulation unit 130, and a projection optical system 140. The light source unit 120 includes laser light sources 121 and 122 as solid light sources. The laser light sources 121 and 122 are configured by blue semiconductor laser elements that emit blue laser light. The blue laser light will be described as blue light below. Each of the laser light sources 121 and 122 may have a configuration in which a plurality of semiconductor elements are provided, and each of the semiconductor elements emits blue light. The light source unit 120 may include an optical scanning element, a lens group, and a light control unit, for example. The optical scanning element performs scanning with blue light emitted by the laser light sources 121 and 122. The lens group is used for improving optical characteristics of the blue light. The light control unit reduces the light quantity. Illustrations of the optical scanning element, the lens group, and the light control unit are omitted.

The light source unit 120 further includes laser light source drivers 123 and 124, a light source optical system 127, and a diffusion plate 128. The light source optical system 127 includes a phosphor wheel 125 and a light separation unit 126.

The laser light source driver 123 drives the laser light source 121 in accordance with a control signal input from a light source driving unit 153 described later. The laser light source driver 124 drives the laser light source 122 in accordance with a control signal input from the light source driving unit 153.

The phosphor wheel 125 converts the blue light emitted from the laser light source 121 into yellow light having a complementary color. The yellow light corresponds to "color light having a predetermined color" in the present disclosure. The light separation unit 126 separates the incident yellow light into red light and green light. The red light and the green light correspond to "another color light" in the present disclosure. The diffusion plate 128 diffuses the blue light emitted from the laser light source 122.

The blue light emitted from the laser light source 121 is incident to phosphors of the phosphor wheel 125 and is converted into yellow light. The yellow light obtained by conversion is incident to the light separation unit 126 and is separated into red light and green light with a wavelength component. The red light and the green light obtained by separation of the light separation unit 126 are incident to the optical modulation unit 130 and are modulated to red image light and green image light, respectively. The blue light emitted by the laser light source 122 corresponds to "color light emitted by the solid light source" in the present disclosure.

The blue light emitted from the laser light source 122 is incident to the diffusion plate 128 and is diffused by the diffusion plate 128. The blue light diffused by the diffusion plate 128 is incident to the optical modulation unit 130 and is modulated to blue image light. The blue image light, the red image light, and the green image light obtained by modulation of the optical modulation unit 130 are composed by a composition optical system such as a cross dichroic prism (not illustrated), and light obtained by the composition is projected onto the projection surface 180 by the projection optical system.

The light source driving unit 153 controls the laser light source drivers 123 and 124 in accordance with control of the control unit 110 and controls turning-on and turning-off of the laser light sources 121 and 122 and the luminance of light emitted by the laser light sources 121 and 122.

The optical modulation unit 130 modulates the blue light, the red light, and the green light incident from the light source unit 120 so as to generate image light, and outputs the generated image light to the projection optical system 140. As a specific configuration of the optical modulation unit 130, for example, a type using three transmissive or reflective liquid crystal panels corresponding to the three primary colors of red, green, and blue or a digital light processing (DLP) type may be provided.

In the embodiment, a case where the optical modulation unit 130 includes three transmissive liquid crystal panels corresponding to color light of the three primary colors of red, green, and blue will be described. The liquid crystal panel for modulating blue light will be described as a B panel 131. The liquid crystal panel for modulating red light will be described as an R panel 133. The liquid crystal panel for modulating green light will be described as a G panel 135.

Each of the B panel 131, the R panel 133, and the G panel 135 has a configuration in which a plurality of pixels are arranged in a matrix. Each of the pixels is driven by a liquid crystal panel driver 155.

The liquid crystal panel driver 155 generates a driving voltage for driving each of pixels constituting each of the B panel 131, the R panel 133, and the G panel 135, based on an image signal input from the image processing unit 165 described later. The liquid crystal panel driver 155 applies the generated driving voltage to a transparent electrode (not illustrated) so as to adjust transmittance of each of the pixels constituting each of the B panel 131, the R panel 133, and the G panel 135 and draws an image on the B panel 131, the R panel 133, and the G panel 135. The red light, the green light, and the blue light modulated by the optical modulation unit 130 are composed by the cross dichroic prism, and thereby image light is obtained. The image light is emitted to the projection optical system 140.

The projection optical system 140 includes the lens group for forming an image by projecting the image light obtained by modulation of the optical modulation unit 130 onto the projection surface 180. In the projection optical system 140, the lens group is driven by rotation of a motor (not illustrated) so as to adjust the zoom, the focus, and the aperture. Illustrations of the lens group and the motor are omitted. The projection optical system 140 may have a configuration in which the lens group moves by a manual operation so as to adjust the zoom, the focus, and the aperture.

The projector 100 includes an operation unit 171, a display unit 173, a remote-control light receiving unit 175, a measurement unit 177, and an input and output interface 179. The operation unit 171, the display unit 173, the remote-control light receiving unit 175, and the measurement unit 177 are coupled to the input and output interface 179. The input and output interface 179 is coupled to a bus 101 so as to transmit and receive data to and from the control unit 110 similarly coupled to the bus 101, via the bus 101.

The operation unit 171 includes various buttons or switches provided on the surface of a casing of the projector 100. The operation unit 171 generates an operation signal corresponding to an operation of the button or switch and outputs the operation signal to the input and output interface 179. The input and output interface 179 outputs the operation signal input from the operation unit 171 to the control unit 110.

The display unit 173 includes a display panel such as a liquid crystal display (LCD) and displays an image, a figure, a character, and the like by control of the control unit 110. A touch panel as the operation unit 171 may be disposed under the display panel to overlap the display panel and may be capable of detecting the touched position of the display panel by the touch panel.

The remote-control light receiving unit 175 receives an infrared signal transmitted from a remote controller 5. The remote-control light receiving unit 175 decodes the received infrared signal to generate an operation signal and outputs the operation signal to the input and output interface 179. The input and output interface 179 outputs the operation signal input from the remote-control light receiving unit 175 to the control unit 110.

The measurement unit 177 images the projection surface 180 and measures the color of an image formed on the projection surface 180 onto which the image light is projected by the projection unit 150. In the embodiment, the measurement unit 177 measures the colors of red, green, and blue.

Figure 2:
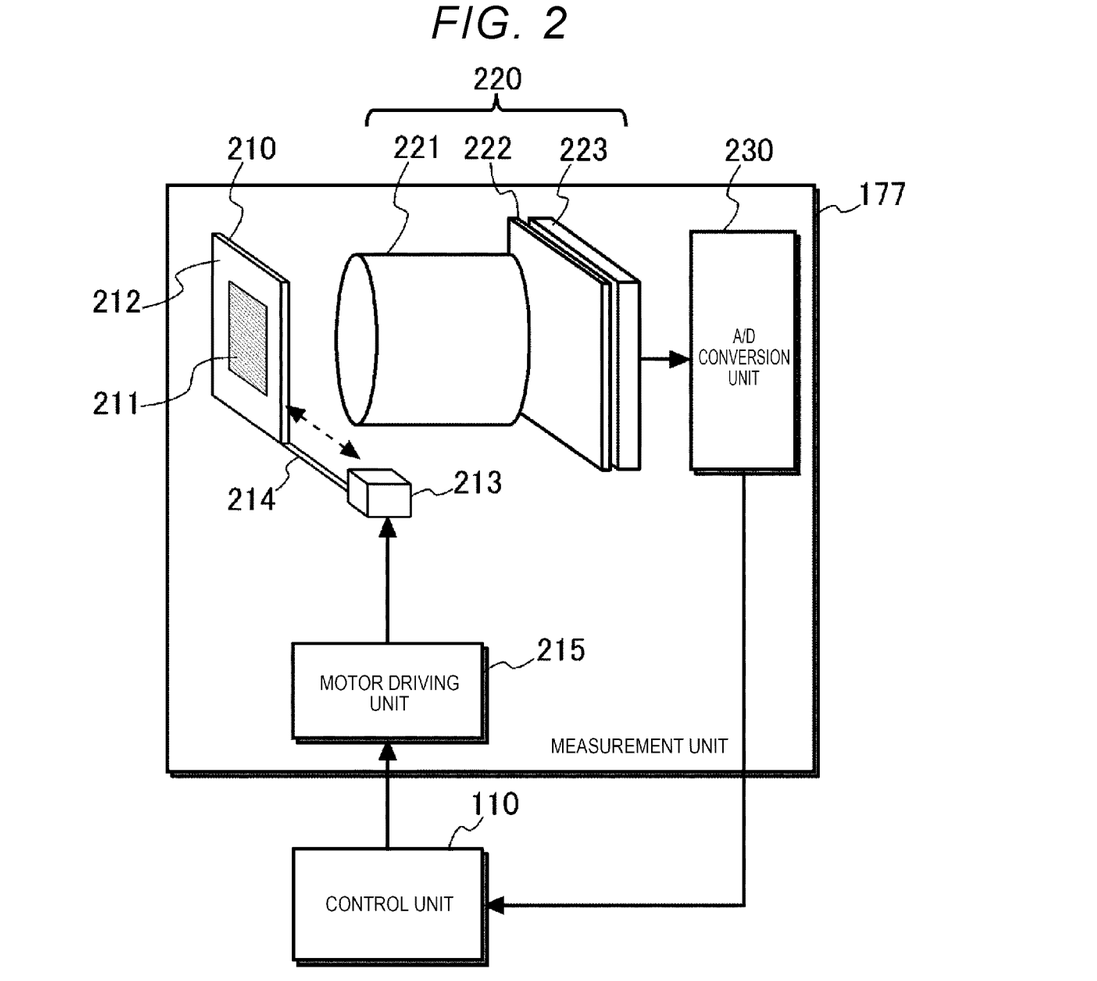
FIG. 2 is a configuration diagram illustrating a measurement unit.

FIG. 2 is a configuration diagram illustrating a configuration of the measurement unit 177.

Here, the configuration of the measurement unit 177 will be described with reference to FIG. 2. The measurement unit 177 includes a filter unit 210, a motor 213, a slide rail 214, a motor driving unit 215, an imaging unit 220, and an A/D conversion unit 230. The imaging unit 220 is configured by an RGB camera including an imaging lens 221, a color filter 222, and a light receiving element 223. The imaging unit 220 measures the color of an image formed on the projection surface 180 by the image light, in terms of each of the colors constituting an RGB color system. The RGB color system corresponds to "a first color system" in the present disclosure.

The filter unit 210 includes a Z filter 211 and a fixation member 212 that fixes the Z filter 211. The filter unit 210 is provided in front of the imaging lens 221.

The Z filter 211 is an optical filter that changes light receiving characteristics of the light receiving element 223.

The Z filter 211 has characteristics that bring spectral transmittance characteristics of the imaging unit 220 close to the characteristics of the human eye in a preset wavelength range. Specifically, the spectral transmittance of the Z filter 211 is adjusted by the product with the spectral transmittance of the color filter 222 so as to be identical to spectral transmittance characteristics of a color matching function $z(\lambda)$. That is, the spectral transmittance of the Z filter 211 is adjusted such that the spectral transmittance of color light transmitted through the Z filter 211 and the color filter 222 matches with the spectral sensitivity of the color matching function $z(\lambda)$. Thus, the imaging unit 220 performs imaging with the color light transmitted through the Z filter 211 and the color filter 222, and thereby it is possible to measure a Z value as a Z component of a tristimulus value in the XYZ color system. The color matching function is a function configured to reproduce spectral sensitivity distribution of the human eye, and is standardized by the International Commission on Illumination (CIE). According to the CIE standard, the color matching function reflects that the human has three-dimensional color coordinates. Three color matching functions of $x(\lambda)$, $y(\lambda)$, and $z(\lambda)$ are defined. $\lambda$ indicates a wavelength. The XYZ color system is also referred to as a CIE1931 color system and corresponds to "a second color system" in the present disclosure.

The filter unit 210 is held to be slidable by the slide rail 214 in the measurement unit 177. The filter unit 210 is driven by the motor 213 to move along the slide rail 214 and to move to a first position and a second position. The first position is a position at which the Z filter 211 is located in front of the imaging lens 221. The second position is a position at which the Z filter 211 is not located in front of the imaging lens 221. That is, when the filter unit 210 is at the second position, light is incident to the imaging lens 221 without being transmitted through the Z filter 211.

The imaging lens 221 is a condensing lens that condenses light passing through the imaging lens 221 on each element constituting the light receiving element 223.

The color filter 222 separates light in a manner of causing light having a specific wavelength in light condensed by the imaging lens 221 to be transmitted through the color filter 222. The color filter 222 has a configuration in which three types of filters which are an R filter causing red light to be transmitted through the R filter, a B filter causing blue light to be transmitted through the B filter, and a G filter causing green light to be transmitted through the G filter are arranged in a predetermined pattern.

The light receiving element 223 is configured by a charge-coupled device (CCD) image sensor or a complementary metal oxide semiconductor (CMOS) image sensor. The light receiving element 223 has a configuration in which a plurality of pixels, each including a photoelectric conversion element, are two-dimensionally arranged.

Each pixel constituting the light receiving element 223 is correlated with any of the R filter, the G filter, and the B filter of the color filter 222. The light receiving element 223 photoelectrically converts light passing through any of the R filter, the G filter, and the B filter for each pixel, and accumulates charges corresponding to the quantity of received light. The light receiving element 223 sequentially outputs an analog signal having a voltage corresponding to the accumulated charges, based on a signal input at a predetermined timing.

The A/D conversion unit 230 performs processing, for example, sampling, gain adjustment, and A/D conversion, on the analog signal output by the light receiving element 223 and outputs a digital signal obtained by the above processing. The digital signal obtained by the conversion of the A/D conversion unit 230 is input to the control unit 110 as a measurement value.

Next, the image processing system of the projector 100 will be described.

The projector 100 includes an interface 161, a frame memory 163, the image processing unit 165, and the control unit 110 as the image processing system. The image processing unit 165 corresponds to "a correction processing unit" in the present disclosure.

The interface 161 includes a connector for wired coupling and an interface circuit corresponding to the connector. The interface 161 is coupled to an image supply device that supplies image data to the projector 100, in a wired manner. In FIG. 1, illustrations of the connector and the interface circuit are omitted. The interface 161 outputs image data received from the image supply device to the image processing unit 165. The image data received from the image supply device corresponds to "image data" in the present disclosure.

FIG. 1 illustrates a case where the projector 100 and the image supply device are coupled to each other in a wired manner. However, the projector 100 and the image supply device may be coupled to each other in a wireless manner. The image data may be received from the image supply device or may be stored in a memory 111 of the control unit 110 in advance.

The image processing unit 165 develops the image data in the frame memory 163. The frame memory 163 includes a plurality of banks. Each of the banks has storage capacity capable of writing one frame of image data. The frame memory 163 is configured by a synchronous dynamic random access memory (SDRAM), for example.

The image processing unit 165 performs image processing, for example, as follows, on the image data developed in the frame memory 163: resolution conversion processing or resizing processing, distortion correction processing, shape correction processing, digital zoom processing, and adjustment of hue or luminance of an image. The image processing unit 165 performs processing designated by the control unit 110. If necessary, the image processing unit 165 performs processing using a parameter input from the control unit 110. The image processing unit 165 may perform combination of plural types of processing among the above-described types of processing. The image processing unit 165 reads the image data subjected to the image processing, from the frame memory 163 and outputs the image data to the liquid crystal panel driver 155 in a form of an image signal.

The control unit 110 includes the memory 111, a processor 113, and peripheral circuits. In FIG. 1, the illustration of the peripheral circuit is omitted. The memory 111 refers to a storage device. The memory 111 may be configured by a non-volatile storage device or may be configured by a non-volatile storage device and a volatile storage device. For example, the non-volatile storage device may be configured by a semiconductor memory such as an EEPROM or a flash memory. For example, the volatile storage device may be configured by a RAM. The memory 111 stores a control program executed by the processor 113, parameters used in image processing, and the like.

The processor 113 may be configured by a single processor or may be configured by a plurality of processors. The processor 113 may be configured by a system on a chip (SoC) obtained by integrating a portion or the entirety of the memory 111 and other circuits. The processor 113 may be configured by a combination of a CPU executing a program and a digital signal processor (DSP) performing an arithmetic operation. All functions of the processor 113 may be mounted in hardware or may be configured using a programmable device.

The control unit 110 and the image processing unit 165 may be each independently or integrally configured by a hardware circuit such as a field-programmable gate array (FPGA) or an application specific integrated circuit (ASIC). The control unit 110 and the image processing unit 165 may be each independently or integrally configured by a central processing unit (CPU) or a microprocessor unit (MPU) that executes a program to realize a predetermined function.

The processor 113 executes the control program stored by the memory 111 to control the components of the projector 100. For example, the processor 113 outputs an instruction to perform image processing corresponding to an operation received by the operation unit 171 or the remote controller 5 and outputs parameters used in the image processing, to the image processing unit 165. For example, the parameters include a geometric correction parameter for correcting geometric distortion of an image projected onto the projection surface 180. The processor 113 controls the light source driving unit 153 to control the laser light source drivers 123 and 124, controls turning-on and turning-off of the laser light sources 121 and 122, and adjusts the luminance. The geometric correction parameter is a generally-known parameter, and thus detailed descriptions of the geometric correction parameter will be omitted.

The processor 113 includes a correction parameter generation unit 115 as a function block. The function block refers to a block corresponding to a function realized by the processor 113 performing a control operation in accordance with a program in the memory 111.

The correction parameter generation unit 115 generates a correction parameter for correcting the hue of an image. The correction parameter generated by the correction parameter generation unit 115 is different from a geometric correction parameter for correcting the geometric distortion of an image. The correction parameter generation unit 115 outputs the generated correction parameter to the image processing unit 165.

The projector 100 measures the color of an image in a manner that the imaging unit 220 images the image projected onto the projection surface 180 by the projection unit 150. The projector 100 performs color correction of correcting the color of the image projected by the projection unit 150 based on the measured color.

Figure 3:
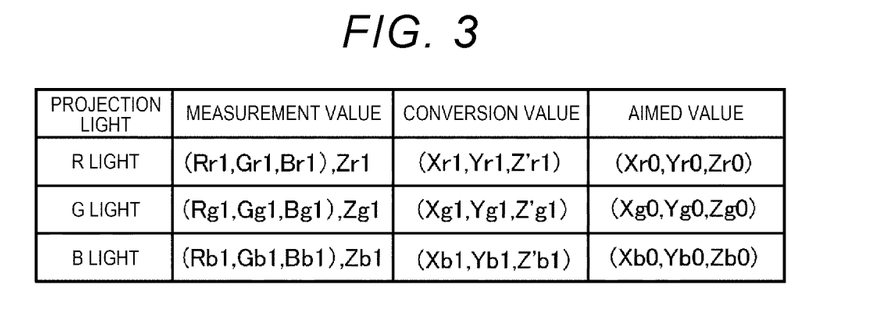
FIG. 3 is a diagram illustrating variables indicating a measurement value, a conversion value, and an aimed value.

FIG. 3 is a diagram illustrating variables indicating the measurement value, the conversion value, and an aimed value. Details of the measurement value, the conversion value, and the aimed value will be described later. An operation of the projector 100 will be described below with reference to FIG. 3.

The aimed value in color correction is stored in the memory 111 of the control unit 110. The laser light sources 121 and 122 are deteriorated with use. If the deterioration of the laser light sources 121 and 122 proceeds, the hue of an image projected by the projector 100 may change. Therefore, the aimed value is obtained before shipment of the projector 100, in a manner that the primary color light is projected by the projection unit 150, and the color of an image formed on the projection surface 180 is measured by a dedicated colorimeter. The primary color light includes R light as red single color light, G light as green single color light, and B light as blue single color light. The colorimeter measures the color of the image formed on the projection surface 180, and outputs an X value, a Y value, and a Z value which are tristimulus values in the XYZ color system, as colorimetric values. The colorimetric value when R light is measured by the colorimeter is described as $(X_r, Y_r, Z_r)$. The subscript "r" described with X, Y, and Z indicates that the colorimetric value is obtained by measuring the R light. Similarly, the colorimetric value when G light is measured by the colorimeter is described as $(X_g, Y_g, Z_g)$. The subscript "g" described with X, Y, and Z indicates that the colorimetric value is obtained by measuring the G light. The colorimetric value when B light is measured by the colorimeter is described as $(X_b, Y_b, Z_b)$. The subscript "b" described with X, Y, and Z indicates that the calorimetric value is obtained by measuring the B light. The aimed values stored in the memory 111 are described as $(X_{r0}, Y_{r0}, Z_{r0})$, $(X_{g0}, Y_{g0}, Z_{g0})$, and $(X_{b0}, Y_{b0}, Z_{b0})$. $(X_{r0}, Y_{r0}, Z_{r0})$, $(X_{g0}, Y_{g0}, Z_{g0})$, and $(X_{b0}, Y_{b0}, Z_{b0})$ are collectively described as an aimed value $X_0Y_0Z_0$.

In the projector 100, the imaging unit 220 images the projection surface 180 onto which the R light, the G light, and the B light are projected by the projector 100. The imaging unit 220 is configured by the RGB camera. Thus, an R value, a G value, and a B value are obtained as measurement values, by the image of the imaging unit 220. Hereinafter, the measurement value obtained by the image is described as $R_1G_1B_1$. The measurement value when a projection of the R light is imaged by the imaging unit 220 is described as $(R_{r1}, G_{r1}, B_{r1})$. The measurement value when a projection of the G light is imaged by the imaging unit 220 is described as $(R_{g1}, G_{g1}, B_{g1})$. The measurement value when a projection of the B light is imaged by the imaging unit 220 is described as $(R_{b1}, G_{b1}, B_{b1})$. The subscripts "r", "g", and "b" are similar to those in a case of the X value, the Y value, and the Z value.

A conversion parameter M is stored in the memory 111. The conversion parameter M is a 3×3 determinant of converting the measurement values $(R_{r1}, G_{r1}, B_{r1})$, $(R_{g1}, G_{g1}, B_{g1})$, and $(R_{b1}, G_{b1}, B_{b1})$ into XYZ values. The calculation expression of the conversion parameter M is represented by Expression (1).

$$M = \begin{pmatrix} X_{r0} & X_{g0} & X_{b0} \\ Y_{r0} & Y_{g0} & Y_{b0} \\ Z_{r0} & Z_{g0} & Z_{b0} \end{pmatrix} \begin{pmatrix} R_{r1} & R_{g1} & R_{b1} \\ G_{r1} & G_{g1} & G_{b1} \\ B_{r1} & B_{g1} & B_{b1} \end{pmatrix}^{-1} \quad (1)$$

Figure 4:
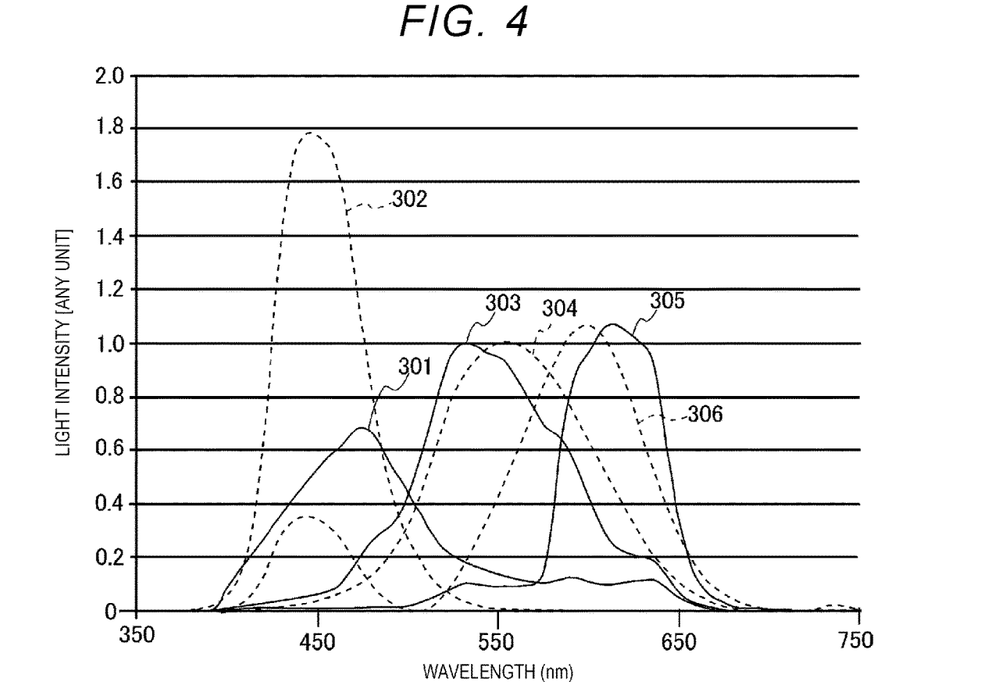
FIG. 4 is a graph illustrating spectral sensitivity characteristics of an imaging unit and spectral sensitivity characteristics of a color matching function.

Here, the reason of setting the aimed value in color correction by not RGB values but XYZ values in the XYZ color system. FIG. 4 is a graph illustrating the spectral sensitivity characteristics of the imaging unit 220 and the spectral sensitivity characteristics of the color matching function.

A curve 301 indicated by a solid line in FIG. 4 indicates spectral sensitivity of the imaging unit 220 that images the B light. A curve 302 indicated by a broken line indicates spectral sensitivity of the color matching function $z(\lambda)$. A curve 303 indicated by a solid line indicates spectral sensitivity of the imaging unit 220 that images the G light. A curve 304 indicated by a broken line indicates spectral sensitivity of the color matching function $y(\lambda)$. A curve 305 indicated by a solid line indicates spectral sensitivity of the imaging unit 220 that images the R light. A curve 306 indicated by a broken line indicates spectral sensitivity of the color matching function $x(\lambda)$. FIG. 4 illustrates a state where the maximum value of light intensity in the spectral sensitivity (indicated by the curve 303) of the imaging unit 220 that images the G light and the spectral sensitivity (indicated by the curve 304) of the color matching function $y(\lambda)$ is normalized to "1.0".

Generally, the spectral sensitivity of the imaging unit 220 does not coincide with the spectral sensitivity of the color matching function, as illustrated in FIG. 4, in many cases. The color matching function indicates the sensitivity distribution of human eyes and has a characteristic which is close to the sensitivity when a person actually sees an object. Therefore, if color correction is performed based on a result obtained by imaging of the imaging unit 220, or if the spectral sensitivity of the imaging unit 220 is not approximate to the spectral sensitivity of the color matching function, a preferable correction result may not be obtained when seen by the human eyes. Therefore, the aimed value in color correction is set by the XYZ values as the tristimulus values in the XYZ color system, and the $R_1G_1B_1$ values being the measurement value obtained from the image of the imaging unit 220 are converted into the XYZ values. The value obtained by converting the measurement value $R_1G_1B_1$ is described as a conversion value $X_1Y_1Z_1$. The correction parameter is generated based on the conversion value $X_1Y_1Z_1$ and the aimed value $X_0Y_0Z_0$. Thus, it is possible to perform color correction at sensitivity in accordance with sensitivity distribution of the human eye.

The laser light sources 121 and 122 have wavelength spectra which change by an influence of aging and a temperature change. When the wavelength spectrum changes, if the $R_1G_1B_1$ value obtained from the image of the imaging unit 220 is converted into the $X_1Y_1Z_1$ value, the measurement value $X_1Y_1Z_1$ after the conversion may include an error, and thus an accurate measurement result may not be obtained.

In the embodiment, the projector 100 has a configuration in which the B light which is emitted from the laser light source 122 and then is diffused by the diffusion plate 128 is caused to be incident to the optical modulation unit 130, and image light is generated by modulating the incident B light. That is, regarding the B light, light itself emitted by the laser light source 122 is used. Therefore, when the temperature change, the aging or the like occurs in the laser light source 122, the spectrum of the B light may be deformed, and thus a wavelength position at which a peak is shown may be shifted.

Figure 5:
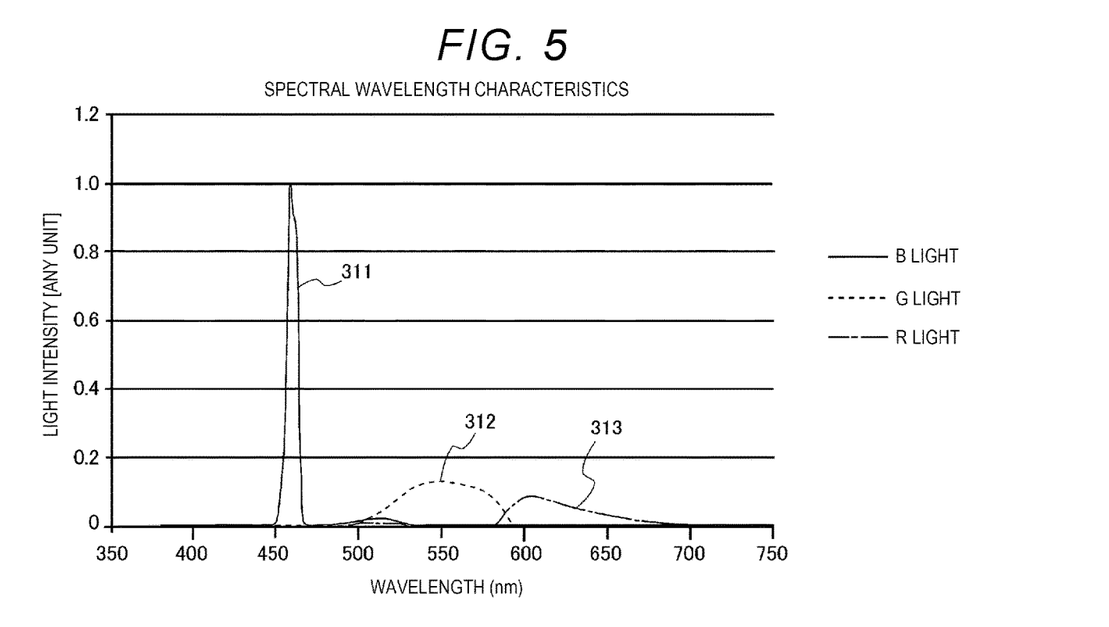
FIG. 5 is a graph illustrating spectral wavelength characteristics of projection light.

FIG. 5 is a graph illustrating the spectral wavelength characteristics of light projected by the projection unit 150. In FIG. 5, a horizontal axis indicates a wavelength, and a vertical axis indicates light intensity. The unit of wavelength is a nanometer, and the unit of light intensity is arbitrarily determined. A curve 311 indicated by a solid line in FIG. 5 indicates spectral wavelength characteristics of the B light. A curve 312 indicated by a broken line indicates spectral wavelength characteristics of the G light. A curve 313 indicated by a one-dot chain line indicates spectral wavelength characteristics of the R light. The waveform showing the spectral wavelength characteristics of the B light has a sharp peak in the vicinity of 460 nm and has a narrow half width, as illustrated in FIG. 5. On the contrary, the waveforms showing the spectral wavelength characteristics of the R light and the G light are waveforms which have a wide half width and do not have a peak.

The projector 100 converts the B light emitted by the laser light source 121 into yellow light by the phosphor wheel 125 and separates the converted yellow light into red light and green light by the wavelength component so as to generate R light or G light. As illustrated in FIG. 5, the R light or the G light has a wide half width, and thus an error occurring in the measurement value obtained by an image obtained by imaging of the imaging unit 220 is small even through the spectrum shape changes or a peak wavelength is shifted, by the temperature change or the aging.

Figure 6:
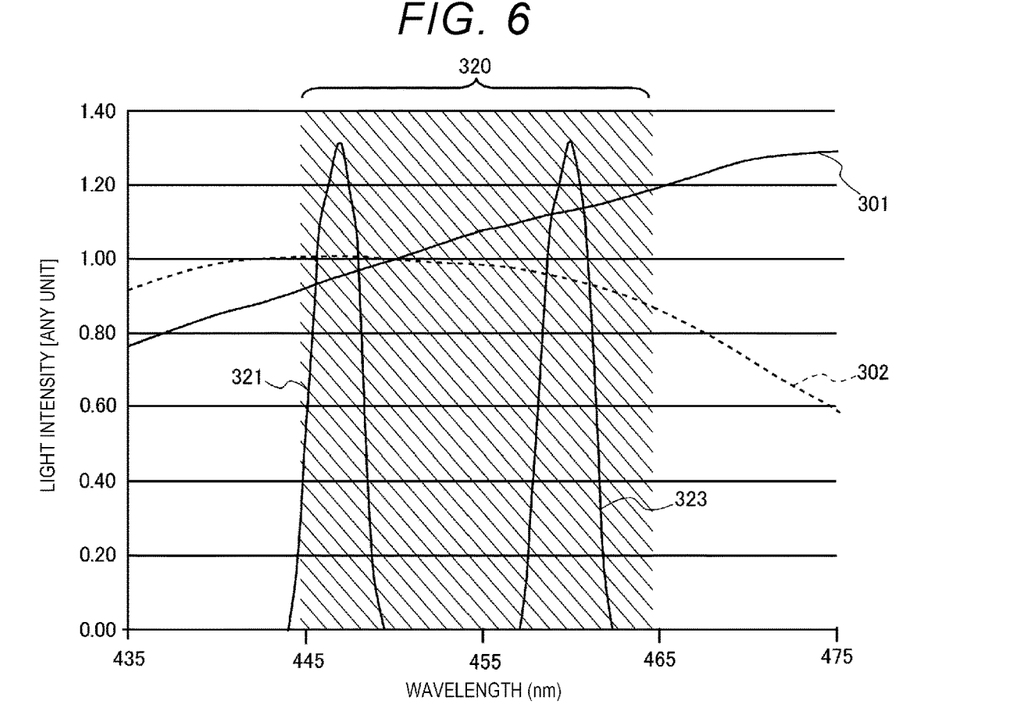
FIG. 6 is a graph illustrating spectral wavelength characteristics of B light projected by a projection unit.

FIG. 6 is a partially-enlarged view of FIG. 5. FIG. is a graph illustrating the spectral wavelength characteristics of the B light in a range of 435 nm to 475 nm and further illustrating a state where the wavelength position showing the peak in the B light is shifted. A curve 321 illustrated in FIG. 6 indicates the spectral wavelength characteristics of the B light before the wavelength position showing a peak is shifted. A curve 323 indicates the spectral wavelength characteristics of the B light after the wavelength position showing a peak is shifted. In FIG. 6, a wavelength range 320 indicated by hatching indicates a shift range of the wavelength of the B light.

In FIG. 6, the curve 301 indicated by a solid line indicates the spectral sensitivity of the imaging unit 220. The curve 302 indicated by a broken line indicates the spectral sensitivity of the color matching function z (λ). That is, the curve 302 corresponds to the sensitivity of the human eye. In FIG. 6, a position at which the curve 301 intersects the curve 321 is lower than a position at which the curve 302 intersects the curve 321. That is, when the curve 321 indicates the spectral wavelength characteristics of the B light, the B light is shown darker than that sensed by the human eyes in an image obtained by imaging of the imaging unit 220.

In FIG. 6, light intensity at the position at which the curve 301 intersects the curve 323 is higher than light intensity at the position at which the curve 302 intersects the curve 323. That is, when the curve 323 indicates the spectral wavelength characteristics of the B light, the B light is shown brighter than that sensed by the human eyes in an image obtained by imaging of the imaging unit 220.

Therefore, in the embodiment, the projector 100 is configured such that the Z filter 211 for creating the characteristics of the color matching function Z(λ) is provided in front of the imaging unit 220, and the Z value among the tristimulus values is measured by the imaging unit 220. Specifically, the Z filter 211 is disposed at the second position, and the R value, the G value, and the B value are measured by the imaging unit 220. Then, the Z filter 211 is disposed at the first position, and the Z value instead of the B value is measured by the imaging unit 220. In the embodiment, a case of measuring the B value and the Z value is described. However, a configuration in which the R value, the G value, and the Z value are measured, and the B value is not measured may be made.

Figure 7:
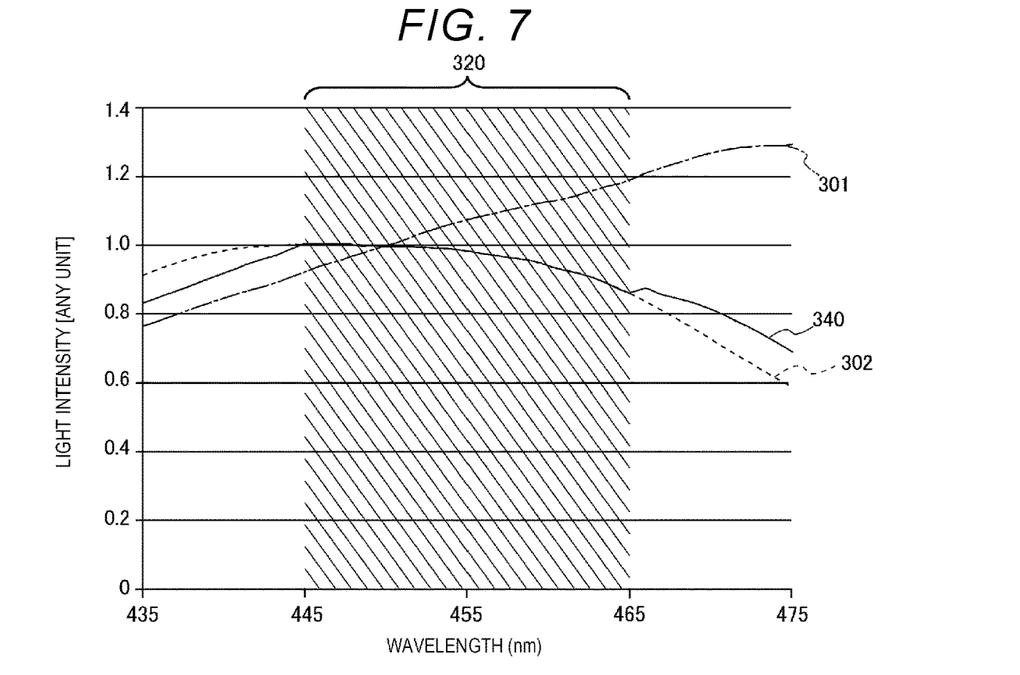
FIG. 7 is a graph illustrating spectral sensitivity characteristics of the measurement unit including a Z filter.

FIG. 7 is a graph illustrating the spectral sensitivity characteristics of the measurement unit 177 including the Z filter 211.

In FIG. 7, the curve 301 indicates spectral sensitivity characteristics of the imaging unit 220, and the curve 302 indicates spectral sensitivity characteristics of the color matching function z(λ). A curve 340 indicated by a solid line in FIG. 7 indicates the spectral transmittance of an optical filter 240 constituted by the Z filter 211 and a B filter 255. The optical filter 240 is a filter that converts the transmittance characteristics of the blue light into the transmittance characteristics of the Z value in the XYZ color system, in the wavelength range of the B light.

The spectral transmittance of the Z filter 211 is adjusted by the product with the spectral transmittance of the color filter 222 so as to completely or substantially coincide with the spectral sensitivity of the color matching function z (λ). Therefore, when the B light transmitted through the Z filter 211 and the color filter 222 is imaged by the imaging unit 220, the spectral sensitivity of the imaging unit 220 completely or substantially coincides with the spectral sensitivity of the color matching function z (λ). Thus, it is possible to measure the color light projected by the projection unit 150 at sensitivity close to the sensitivity of the human eyes by the measurement unit 177 and to perform the measurement with high accuracy without being influenced by variation of the wavelength of the B light.

The Z filter 211 is adjusted by the product with the spectral transmittance of the color filter 222 in a preset wavelength range, for example, in a range of 445 nm to 465 nm being the wavelength range of the B light so as to be identical to the spectral sensitivity of the color matching function z (λ). Therefore, the Z filter 211 is created more easily than a case where the Z filter 211 is created to have spectral transmittance adjusted such that the spectral sensitivity of the imaging unit 220 coincides with the spectral sensitivity of the color matching function z(λ) in the entirety of a visible region.

Figure 8:
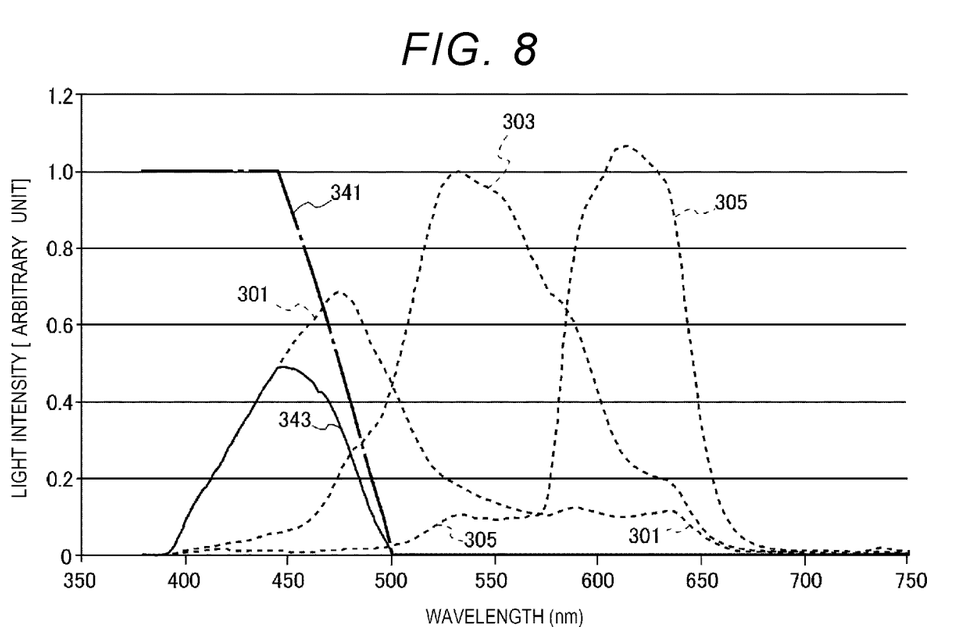
FIG. 8 is a graph illustrating spectral transmittance of an optical filter of the measurement unit.

FIG. 8 is a graph illustrating the spectral transmittance of the optical filter provided in the measurement unit 177.

The curves 301, 303, and 305 indicated by broken lines in FIG. 8 correspond to the spectral sensitivity of the imaging unit 220 that images the B light, that is, to the spectral transmittance of the B filter, the G filter, and the R filter, similar to the curves 301, 303, and 305 in FIG. 4. A curve 341 indicated by a one-dot chain line in FIG. 8 indicates the spectral transmittance of the Z filter 211. A curve 343 indicated by a solid line in FIG. 8 indicates the spectral transmittance of the optical filter constituted by the Z filter 211 and the B filter.

As clear with reference to FIG. 8, the spectral transmittance of the Z filter 211 is set such that the transmittance is reduced as the wavelength becomes longer, in a range of 445 nm to 465 nm being the wavelength range of the B light. The Z filter 211 has transmittance which is 0% at a wavelength of 500 nm. The Z filter 211 causes light in a range of a wavelength larger than 500 nm not to be transmitted through the Z filter 211. Therefore, the spectral transmittance (indicated by the curve 343) of the optical filter constituted by the Z filter 211 and the B filter also means that light in the range of a wavelength larger than 500 nm is not transmitted therethrough. That is, when the Z filter 211 is at the first position, the B light or the G light is cut off or is substantially cut off.

Figure 9:
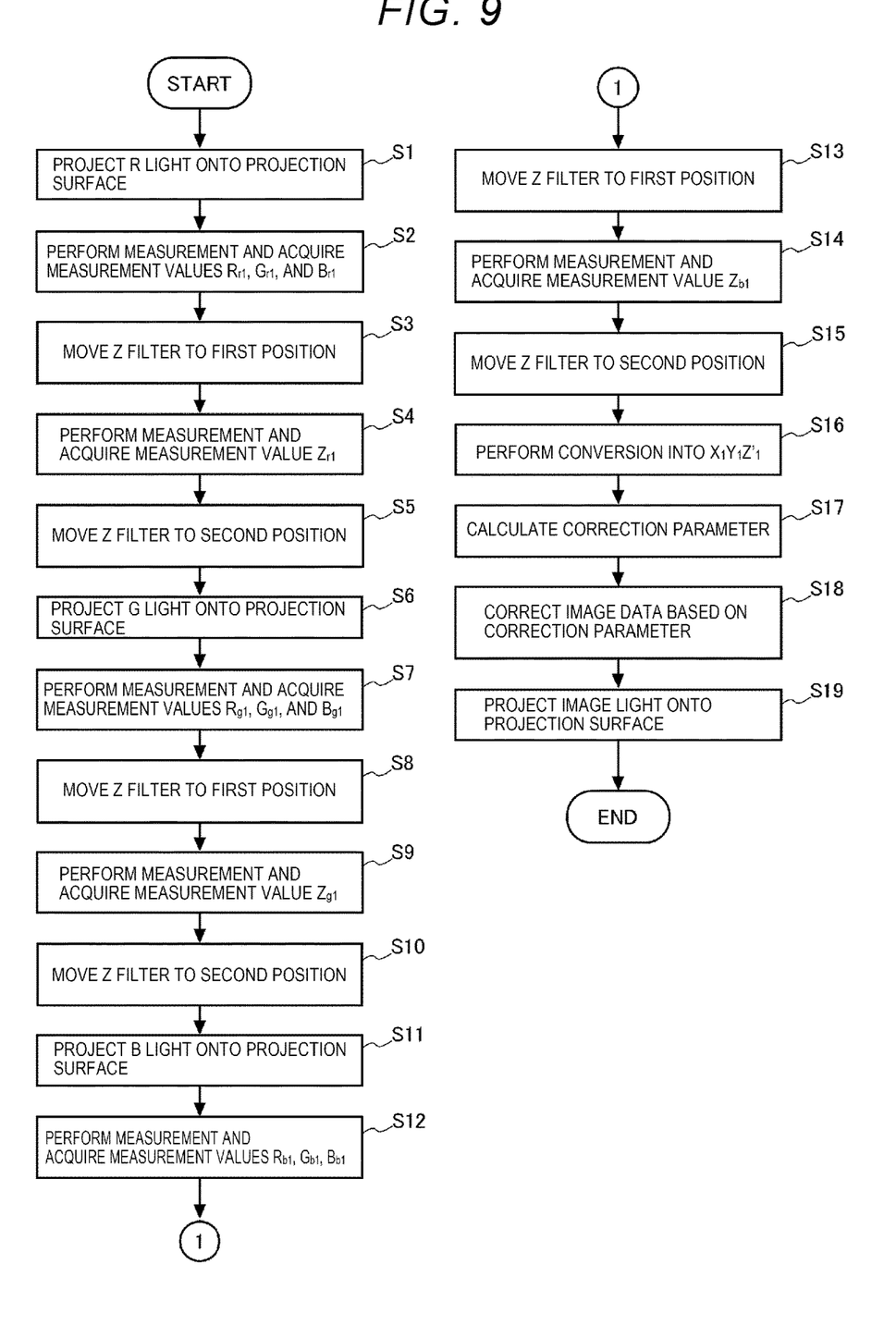
FIG. 9 is a flowchart illustrating an operation of a correction parameter generation unit.

FIG. 9 is a flowchart illustrating the operation of the projector 100.

The operation of the projector 100 will be described with reference to FIG. 9.

For example, when a preset period has elapsed from the previous measurement of an image by the imaging unit 220, or when an operation of color correction by the remote controller 5 or the operation unit 171 is received, the control unit 110 causes the projection unit 150 to project the R light being red single color light (Step S1). For example, the control unit 110 may control the image processing unit 165 such that the transmittance of the B panel 131 and the G panel 135 is set to 0%, and the transmittance of the R panel 133 is set to 100%. Specifically, the control unit 110 controls the image processing unit 165 to process image data of the red single color and to output an image signal corresponding to the image data after the processing to the liquid crystal panel driver 155. The liquid crystal panel driver 155 that receives the input of the image signal corresponding to the red single color controls the transmittance of the B panel 131 and the G panel 135 to be 0% and controls the transmittance of the R panel 133 to be 100%.

The control unit 110 may control the laser light source driver 123 to cause the laser light source 122 to emit the B color light and control the laser light source driver 124 to stop an output of the laser light source 122. In this case, the control unit 110 controls the image processing unit 165 such that the transmittance of the G panel 135 is set to 0%, and the transmittance of the R panel 133 is set to 100%.

The control unit 110 controls the motor driving unit 215 to move the filter unit 210 to the second position, before the control unit 110 causes the measurement unit 177 to perform measurement. That is, the Z filter 211 is not disposed in front of the imaging lens 221. Then, the control unit 110 controls the measurement unit 177 to perform measurement and acquires the measurement value measured by the measurement unit 177 (Step S2). Here, the control unit 110 acquires $R_{r1}$ as an R component, $G_{r1}$ as a G component, and $B_{r1}$ as a B component, as the measurement value. The measurement value ($R_{r1}$, $G_{r1}$, $B_{r1}$) illustrated in FIG. 3 is obtained. "$R_{r1}$" and "$G_{r1}$" correspond to a first measurement value in the present disclosure.

The measurement value $R_{r1}$ is a measurement value corresponding to an output of the light receiving element 223 receiving light passing through the R filter of the color filter 222. The measurement value $G_{r1}$ is a measurement value corresponding to an output of the light receiving element 223 receiving the light passing through the G filter of the color filter 222. The measurement value $B_{r1}$ is a measurement value corresponding to an output of the light receiving element 223 receiving the light passing through the B filter of the color filter 222.

Then, the control unit 110 controls the motor driving unit 215 to move the filter unit 210 at the second position to the first position (Step S3). The Z filter 211 is disposed in front of the imaging lens 221 by moving the filter unit 210 to the first position. If the filter unit 210 is moved to the first position, the control unit 110 controls the measurement unit 177 to perform measurement again and acquires the measurement value $Z_r1$ measured by the measurement unit 177 (Step S4). The measurement value $Z_{r1}$ illustrated in FIG. 3 is obtained. The measurement value $Z_r1$ corresponds to "a second measurement value" in the present disclosure.

The measurement value $Z_r1$ is a measurement value when the measurement unit 177 measures the projection surface 180 onto which the R light has been projected and is a measurement value corresponding to the output of the light receiving element 223 receiving light which passes through the Z filter 211 and the color filter 222. The measurement value $Z_r1$ corresponds to "at least one color which is measured by the measurement unit 177 and constitutes the second color system".

If the measurement of the R light ends, the control unit 110 controls the motor driving unit 215 to move the filter unit 210 to the second position (Step S5), and thus the Z filter 211 is not disposed in front of the imaging lens 221.

The control unit 110 causes the G light being green single light to be projected onto the projection surface 180 (Step S6). The control unit 110 causes the measurement unit 177 to perform measurement and acquires the measurement value (Step S7). Here, the control unit 110 acquires $R_{g1}$ as the R component, $G_{g1}$ as the G component, and $B_{g1}$ as the B component, as the measurement value. The measurement value ($R_{g1}$, $G_{g1}$, $B_{g1}$) illustrated in FIG. 3 is obtained. "$R_{g1}$" and "$G_{g1}$" correspond to the first measurement value in the present disclosure.

The measurement value $R_{g1}$ is a measurement value corresponding to an output of the light receiving element 223 receiving light passing through the R filter of the color filter 222. The measurement value $G_{g1}$ is a measurement value corresponding to an output of the light receiving element 223 receiving the light passing through the G filter of the color filter 222. The measurement value $B_{g1}$ is a measurement value corresponding to an output of the light receiving element 223 receiving the light passing through the B filter of the color filter 222.

Then, the control unit 110 controls the motor driving unit 215 to move the filter unit 210 to the first position (Step S8). The Z filter 211 is disposed in front of the imaging lens 221 by moving the filter unit 210 to the first position. If the filter unit 210 is moved to the first position, the control unit 110 controls the measurement unit 177 to perform measurement again and acquires the measurement value $Z_{g1}$ (Step S9). The measurement value $Z_{g1}$ illustrated in FIG. 3 is obtained. The measurement value $Z_{g1}$ corresponds to "the second measurement value" in the present disclosure.

The measurement value $Z_{g1}$ is a measurement value when the measurement unit 177 measures the projection surface 180 onto which the G light has been projected and is a measurement value corresponding to the output of the light receiving element 223 receiving light which passes through the Z filter 211 and the color filter 222. The measurement value $Z_{g1}$ corresponds to "at least one color which is measured by the measurement unit 177 and constitutes the second color system".

If the measurement of the G light ends, the control unit 110 controls the motor driving unit 215 to move the filter unit 210 to the second position (Step S10), and thus the Z filter 211 is not disposed in front of the imaging lens 221.

The control unit 110 causes the B light being blue single light to be projected onto the projection surface 180 (Step S11). The control unit 110 controls the measurement unit 177 to perform measurement and acquires the measurement value (Step S12). Here, the control unit 110 acquires $R_{b1}$ as the R component, $G_{b1}$ as the G component, and $B_{b1}$ as the B component, as the measurement value. The measurement value ($R_{b1}$, $G_{b1}$, $B_{b1}$) illustrated in FIG. 3 is obtained. "$R_{b1}$" and "$G_{b1}$" correspond to the first measurement value in the present disclosure.

The measurement value $R_{b1}$ is a measurement value corresponding to an output of the light receiving element 223 receiving light passing through the R filter of the color filter 222. The measurement value $G_{b1}$ is a measurement value corresponding to an output of the light receiving element 223 receiving the light passing through the G filter of the color filter 222. The measurement value $B_{b1}$ is a measurement value corresponding to an output of the light receiving element 223 receiving the light passing through the B filter of the color filter 222.

The control unit 110 controls the motor driving unit 215 to move the filter unit 210 to the first position (Step S13). The Z filter 211 is disposed in front of the imaging lens 221 by moving the filter unit 210 to the first position. If the filter unit 210 is moved to the first position, the control unit 110 controls the measurement unit 177 to perform measurement again and acquires the measurement value $Z_{b1}$ (Step S14). The measurement value $Z_{b1}$ illustrated in FIG. 3 is obtained. The measurement value $Z_{b1}$ corresponds to "the second measurement value" in the present disclosure.

The measurement value $Z_{b1}$ is a measurement value when the measurement unit 177 measures the projection surface 180 onto which the B light has been projected and is a measurement value corresponding to the output of the light receiving element 223 receiving light which passes through the Z filter 211 and the color filter 222. The measurement value $Z_{b1}$ corresponds to "at least one color which is measured by the measurement unit 177 and constitutes the second color system". If the measurement of the B light ends, the control unit 110 controls the motor driving unit 215 to move the filter unit 210 to the second position (Step S15).

Then, the control unit 110 converts the $R_1G_1Z_1$ value being the measurement value measured by projecting the R light, the G light, and the B light onto the projection surface 180 into the $X_1Y_1Z_1$ value (Step S16). The conversion values $(X_{r1}, Y_{r1}, Z'_{r1})$, $(X_{g1}, Y_{g1}, Z'_{g1})$, and $(X_{b1}, Y_{b1}, Z'_{b1})$ in FIG. 3 are obtained. The control unit 110 converts the $R_1G_1Z_1$ value into a $X_1Y_1Z_1$ value by a conversion expression (2) described below. $X_{r1}, Y_{r1}, Z'_{r1}, X_{g1}, Y_{g1}, Z'_{g1}$, and $X_{b1}, Y_{b1}$, and $Z'_{b1}$ correspond to "the conversion values" in the present disclosure.

The $R_1$ value in the $R_1G_1Z_1$ value includes $R_{r1}$ measured by projecting the R light, $R_{g1}$ measured by projecting the G light, and $R_{b1}$ measured by projecting the B light. The $G_1$ value in the $R_1G_1Z_1$ value includes $G_{r1}$ measured by projecting the R light, $G_{g1}$ measured by projecting the G light, and $G_{b1}$ measured by projecting the B light. The $Z_1$ value in the $R_1G_1Z_1$ value includes $Z_{r1}$ measured by projecting the R light, $Z_{g1}$ measured by projecting the G light, and $Z_{b1}$ measured by projecting the B light.

The $X_1$ value in the $X_1Y_1Z_1$ being the values after the conversion includes $X_{r1}$ as the R component, $X_{g1}$ as the G component, and $X_{b1}$ as the B component. The $Y_1$ value in the $X_1Y_1Z_1$ being the values after the conversion includes $Y_{r1}$ as the R component, $Y_{g1}$ as the G component, and $Y_{b1}$ as the B component.

$$\begin{pmatrix} X_{r1} & X_{g1} & X_{b1} \\ Y_{r1} & Y_{g1} & Y_{b1} \\ Z'_{r1} & Z'_{g1} & Z'_{b1} \end{pmatrix} = M \times \begin{pmatrix} R_{r1} & R_{g1} & R_{b1} \\ G_{r1} & G_{g1} & G_{b1} \\ Z_{r1} & Z_{g1} & Z_{b1} \end{pmatrix} \quad (2)$$

$Z'_{r1}$ in Expression (2) is the R component of the Z value after the calculation by Expression (2). $Z'_{g1}$ is the G component of the Z value after the calculation by Expression (2). $Z'_{b1}$ is the B component of the Z value after the calculation by Expression (2). $Z'_{r1}, Z'_{g1}$, and $Z'_{b1}$ are substantially equal to $Z_{r1}, Z_{g1}$, and $Z_{b1}$.

If the $R_1G_1Z_1$ value being the measurement value of the measurement unit 177 is converted into the $X_1Y_1Z_1$ value, the control unit 110 calculates the correction parameter used in color correction based on the converted $X_1Y_1Z_1$ value and the aimed value $X_0Y_0Z_0$ (Step S17).

The correction parameter is calculated based on the conversion value $(X_{r1}, Y_{r1}, Z'_{r1})$ and the aimed value $(X_{r0}, Y_{r0}, Z_{r0})$. Similarly, the correction parameter is calculated based on the conversion value $(X_{g1}, Y_{g1}, Z'_{g1})$ and the aimed value $(X_{g0}, Y_{g0}, Z_{g0})$. Similarly, the correction parameter is calculated based on the conversion value $(X_{b1}, Y_{b1}, Z'_{b1})$ and the aimed value $(X_{b0}, Y_{b0}, Z_{b0})$. The control unit 110 stores the calculated correction parameters in the memory 111.

If a supply of image data from the image supply device starts, the control unit 110 reads the correction parameter from the memory 111 and outputs the read correction parameter to the image processing unit 165.

The image processing unit 165 develops the image data received by the interface 161 in the frame memory 163. The image processing unit 165 performs correction processing of correcting the brightness or the hue of the developed image data by using the correction parameter acquired from the control unit 110 (Step S18). If the correction processing ends, the image processing unit 165 reads the image data developed in the frame memory 163 and outputs the image data to the liquid crystal panel driver 155 in a form of an image signal. The liquid crystal panel driver 155 generates a driving voltage based on the image signal input from the image processing unit 165. The liquid crystal panel driver 155 drives the B panel 131, the R panel 133, and the G panel 135 in accordance with the generated driving voltage so as to draw an image in the B panel 131, the R panel 133, and the G panel 135. Thus, the image light corrected by the correction parameter is projected onto the projection surface 180 (Step S19).

As described above, in the embodiment, the projector 100 is a device that projects image light onto the projection surface 180 based on image data. The projector 100 includes the measurement unit 177, the correction parameter generation unit 115, and the image processing unit 165.

The measurement unit 177 measures the color of the image light forming an image on the projection surface 180 in terms of the plurality of colors constituting the RGB color system as the first color system.

The correction parameter generation unit 115 obtains the XYZ values as the conversion value obtained by converting the measurement value of the color in the RGB color system, which is measured by the measurement unit 177, into the color in the XYZ color system as the second color system. The correction parameter generation unit 115 generates the correction parameter based on the obtained XYZ values.

The image processing unit 165 corrects image light by correcting image data with the correction parameter.

The measurement unit 177 measures the Z value corresponding to at least one color constituting the XYZ color system. The correction parameter generation unit 115 generates the correction parameter based on the Z value measured by the measurement unit 177 among the colors constituting the XYZ color system and the X value and the Y value obtained by converting the measurement value of the color in the RGB color system, which is measured by the measurement unit 177.

Thus, it is possible to measure the color of image light forming an image on the projection surface 180 with high accuracy and to generate the correction parameter for correcting the image light based on the measurement result. Therefore, it is possible to perform color correction of image light with high accuracy.

The measurement unit 177 includes the light receiving element 223 and the Z filter 211 that changes the light receiving characteristics of the light receiving element 223.

The measurement unit 177 measures the RGB value obtained by causing the light receiving element 223 to receive color light which is not transmitted through the Z filter 211. The projector 100 causes the light receiving element 223 to receive the color light transmitted through the Z filter 211 and measure the Z value.

Thus, it is possible to measure the Z value without providing the dedicated colorimeter.

The projector 100 includes the laser light sources 121 and 122 as the solid light source and the light source optical system 127 that generates color light from light emitted by the laser light sources 121 and 122. The projector 100 further includes the optical modulation unit 130 that modulates blue light emitted by the laser light source 122, and red light and green light generated by the light source optical system 127 so as to generate image light.

Thus, it is possible to generate image light including red light, green light, and blue light.

The Z filter 211 has a configuration of changing the light receiving characteristics of the light receiving element 223 in the wavelength range including the light emitted by the laser light source 122.

Thus, the Z filter 211 is created more easily than that when the Z filter 211 that changes the light receiving characteristics of the light receiving element 223 in the entirety of a visible region is created.

The phosphor wheel 125 as the light source optical system obtains yellow light by causing the blue light emitted by the laser light source 122 to abut against the phosphor wheel 125. The light separation unit 126 as the light source optical system 127 separates the incident yellow light so as to generate red light and green light which are a portion of the color light.

Thus, it is not necessary that the solid light source that emits each of the red light, the blue light, and the green light is provided. Thus, it is possible to simplify the configuration of the projector.

When only the laser light sources 121 and 122 that emit blue light are provided, only the Z filter 211 is provided as the optical filter that changes the light receiving characteristics of the light receiving element 223 and the Z value is measured. Thus, it is possible to measure the color of image light with high accuracy.

That is, in the laser light sources 121 and 122 as the solid light source, the spectrum of blue light may be deformed by the temperature change or the aging, and the peak wavelength may be shifted. Thus, it is possible to measure a value close to the spectral sensitivity when the person actually sees an object by eyes, by providing the Z filter 211 and measuring the Z value instead of measuring blue light by the measurement unit 177.

The first color system is the RGB color system. The second color system is the XYZ color system. The measurement unit 177 outputs the measurement value of R, G, and B constituting the RGB color system and outputs the Z value in the XYZ color system as the measurement value.

Thus, it is possible to perform conversion into the XYZ values based on the measurement values of R and G and the Z value, which are measured by the measurement unit 177. Accordingly, it is possible to perform color correction based on sensitivity distribution of the human eye.

Modification Example 1

In the above-descriptions of the flowchart, a case of correcting the color of image light projected by one projector 100 is described as an example. However, the present disclosure may be applied to a case of performing color matching of image light projected by two projectors 100.

Figure 10:
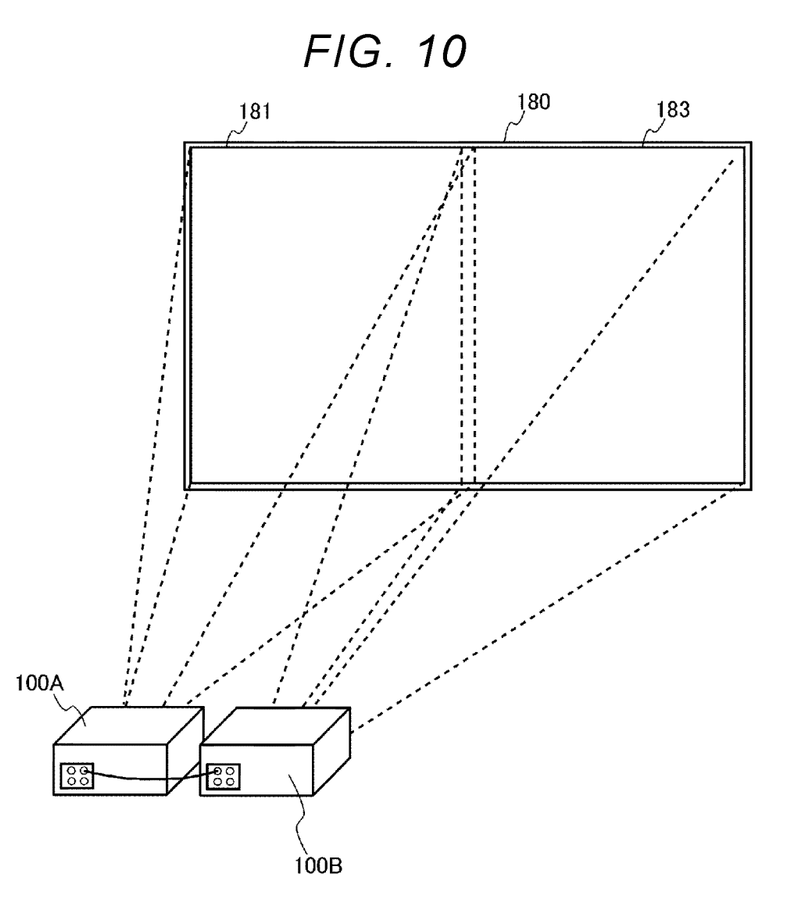
FIG. 10 is a system configuration diagram.

FIG. 10 is a diagram illustrating a system configuration in the modification example.

For example, two projectors 100 which are a projector 100A and a projector 100B as the projector 100 are prepared. The projector 100A and the projector 100B are coupled to each other to be capable of communicating with each other by a wired cable or wireless communication. The projector 100A and the projector 100B are arranged in parallel in a horizontal direction of the projection surface 180.

The projector 100A projects image light in a projection region on the left side of the projection surface 180. The projector 100B projects image light in a projection region on the right side of the projection surface 180. The projection region in which the projector 100A projects an image is referred to as a projection region 181. The projection region in which the projector 100B projects an image is referred to as a projection region 183. The projector 100A includes the measurement unit 177. The measurement unit 177 has an angle of view capable of measuring the projection regions 181 and 183. In order to distinguish the projection region 181 and the projection region 183 from the image obtained by imaging of the imaging unit 220 of the measurement unit 177, the projector 100A projects a preset pattern image in the projection region 181, and the imaging unit 220 performs imaging of the projected image. The projector 100A specifies a region in which the pattern image is imaged in the image, as the projection region 181. Similarly, the projector 100A causes the projector 100B to project a preset pattern image in the projection region 183, and the imaging unit 220 performs imaging of the projected image. The projector 100A specifies a region in which the pattern image is imaged in the image, as the projection region 183.

The projector 100A sequentially projects the R light, the G light, and the B light in the projection region 181 and causes the measurement unit 177 to perform measurement, in accordance with the flowchart illustrated in FIG. 9. Specifically, the projection region 181 in which the R light is projected is measured, and thus Rr as the R component, Gr as the G component, Br as the B component, and $Z_r$ as the Z component are measured. The projection region 181 in which the G light is projected is measured, and thus Rg as the R component, Gg as the G component, Bg as the B component, and $Z_g$ as the Z component are measured. The projection region 181 in which the B light is projected is measured, and thus Rb as the R component, Gb as the G component, Bb as the B component, and $Z_b$ as the Z component are measured. Then, the projector 100A converts the RGB values into the XYZ values with Expression (2) described above.

Then, the projector 100A instructs the projector 100B to project the R light. The projector 100B projects the R light in the projection region 183 in accordance with the instruction of the projector 100A. If the projector 100B projects the R light, the projector 100A causes the measurement unit 177 to measure the projection region 183 and to measure Rr as the R component, Gr as the G component, Br as the B component, and $Z_r$ as the Z component. Similarly, if the projector 100B projects the G light, the projector 100A causes the measurement unit 177 to measure the projection region 183 and to measure Rg as the R component, Gg as the G component, Bg as the B component, and $Z_g$ as the Z component. Similarly, if the projector 100B projects the B light, the projector 100A causes the measurement unit 177 to measure the projection region 183 and to measure Rb as the R component, Gb as the G component, Bb as the B component, and $Z_b$ as the Z component.

The projector 100A converts the RGB values into the XYZ values with Expression (2) described above.

The projector 100A generates the correction parameter of setting the XYZ values obtained by converting the measurement value of the projection region 181 as the aimed value and setting the XYZ values obtained by converting the measurement value of the projection region 183 as the aimed value. The projector 100A transmits the generated correction parameter to the projector 100B. The projector 100B corrects the image data by using the correction parameter received from the projector 100A and projects the image light in the projection region 183 based on the corrected image data.

Modification Example 2

In the above-described embodiment, the configuration in which the projector 100 includes the measurement unit 177 and the correction parameter generation unit 115 is described. However, the correction parameter generation unit 115 may be provided on the outside of the projector 100.

Figure 11:
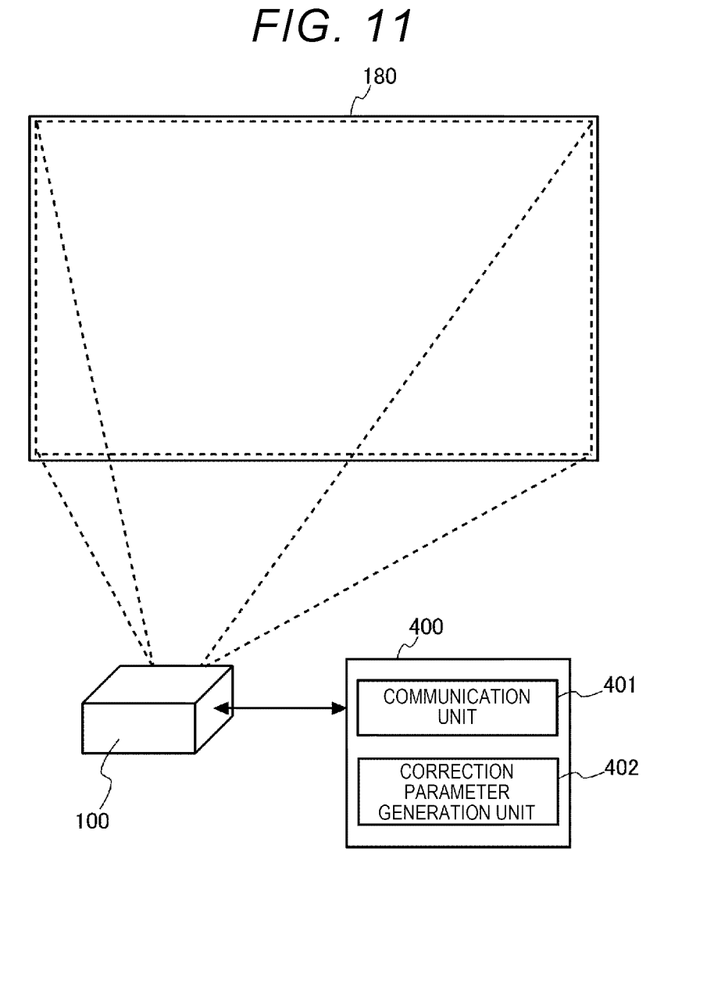
FIG. 11 is a system configuration diagram illustrating a color correction system.

FIG. 11 is a system configuration diagram illustrating a color correction system including a control device 400 and the projector 100. The control device 400 includes a communication unit 401 and a correction parameter generation unit 402. The control device 400 is realized by a computer including a processor and a memory, for example. The control device 400 corresponds to "a correction parameter generation device" in the present disclosure.

The communication unit 401 includes a connector for wired coupling and an interface circuit corresponding to the connector. The communication unit 401 is coupled to the projector 100 in a wired manner. Illustrations of the connector and the interface circuit are omitted.

The correction parameter generation unit 402 receives the measurement value measured by the measurement unit 177 in the projector 100 from the projector 100. The correction parameter generation unit 402 generates the correction parameter based on the R value, the G value, the B value, and the Z value being the received measurement value. The correction parameter generation unit 402 transmits the generated correction parameter to the projector 100.

The correction parameter generation unit 402 may be realized by the processor executing a control program or may be configured by a hardware circuit such as a field-programmable gate array (FPGA) or an application specific integrated circuit (ASIC).

An imaging device such as a camera, which is provided on the outside of the projector 100 may be used instead of the measurement unit 177. For example, the measurement unit may be provided in the above-described control device 400, and the measurement unit may measure the color of the image light forming an image on the projection surface 180.

Modification Example 3

In the above-described embodiment, a configuration in which the slide mechanism is provided, and the filter unit 210 is caused to slide between the first position and the second position is described. In Modification Example 3, a configuration in which two imaging units 220 are provided, one imaging unit 220 images the RGB values, and the other imaging unit 220 measures the Z value may be made. The imaging unit 220 that measures the Z value may be capable of measuring the Z value. For example, a monochrome camera may be used for the imaging unit 220.

Modification Example 4

In the above-described embodiment, the B value among the measurement values of the measurement unit 177 is not used in conversion into the XYZ values. However, when the value of $Z_r$ as the measurement value when the R light is projected and the value of $Z_b$ as the measurement value when the B light is projected are sufficiently smaller than $Z_b$, Br and Bg may be used instead of $Z_r$ and $Z_g$ in Expression (2). In this case, when the R light and the G light are projected, measurement of $Z_r$ and $Z_b$ is not required. Thus, it is possible to reduce a measurement time.

Modification Example 5

In the above-described flowchart, the configuration in which the measurement unit 177 measures the R value, the G value, and the B value is described. However, when the B value is not used in conversion into the XYZ values, the measurement unit 177 may not output the B value (Br, Bg, Bb) to the control unit 110. That is, the measurement unit 177 outputs the R value and the G value in the RGB color system and the Z value in the XYZ color system, as the measurement values.

Thus, it is possible to reduce the measurement time in comparison to a case where the measurement unit 177 measures the R value, the G value, and the B value. Since it is possible to perform conversion into the XYZ values based on the measurement values of R and G and the Z value, which are measured by the measurement unit 177, it is possible to perform color correction based on sensitivity distribution of the human eye.

The above-described embodiment is a preferred embodiment of the present disclosure. However, the present disclosure is not limited thereto, and various modifications can be made in a range without departing from the gist of the present disclosure.

For example, in the above-described embodiment, the projection unit 150 projects the R light, the G light, and the B light onto the projection surface 180. However, the gradation of each of the R light, the G light, and the B light may be changed, and the measurement unit 177 may perform measurement at the changed gradations and output the measurement value. With such a configuration, it is possible to further improve the accuracy of color correction.

The control method for the projector in the present disclosure may be realized by a computer in the projector 100 or an external device coupled to the projector 100. In this case, the control method for the projector in the present disclosure may be configured in a form of a program executed by a computer in order to realize the method. The control method for the projector may be configured in a form of a recording medium in which such a program is recorded so as to be readable by a computer or a transmission medium for transmitting the program.

A process unit of the flowchart illustrated in FIG. 9 is divided in accordance with the main processing content in order to easily understand the processing of the control unit 110 of the projector 100. The present disclosure is not limited by the division method and names of process units illustrated in the flowchart in FIG. 9. The processing of the control unit 110 may be divided into more process units, in accordance with the processing content, or division may be performed such that one processing unit includes more processing. The process order of the flowchart is also not limited to the example illustrated in the flowchart.

The program executed by the processor 113 may be stored in a storage device, a storage medium, or the like which is configured to be separate from the projector 100, in addition to the memory 111. The processor 113 may acquire and execute the program stored in an external device.

In the above-described embodiment, a configuration in which the optical modulation unit 130 includes a liquid crystal panel is described as an example. However, the optical modulation unit 130 may include a reflective liquid crystal display element or other image display elements such as digital micromirror devices.

What is claimed is:

1. A projector that projects image light onto a projection surface based on image data, the projector comprising:
a camera that measures a color of an image formed on the projection surface by the image light, in terms of a plurality of colors constituting a first color system and at least one of colors constituting a second color system;

one or more processors programmed to:
generate a correction parameter based on a conversion value and a second measurement value of the color, which is measured by the camera among the colors constituting the second color system, the conversion value being obtained by converting a first measurement value of the color in the first color system, which is measured by the camera, into the color in the second color system; and
correct the image light with the correction parameter;
wherein the camera includes a light receiving element and an optical filter that changes light receiving characteristics of the light receiving element,
light which is not transmitted through the optical filter is received by the light receiving element, and the first measurement value of the color constituting the first color system is output, and
light transmitted through the optical filter is received by the light receiving element, and the second measurement value of the color constituting the second color system is output.

2. The projector according to claim 1, further comprising:
a solid light source;
a light source optical system that generates another color light from color light emitted by the solid light source; and
a modulation optical system that modulates the other color light generated by the light source optical system and the color light emitted by the solid light source, so as to generate the image light including light of the colors constituting the first color system.

3. The projector according to claim 2, wherein
the optical filter changes light receiving characteristics of the light receiving element n a wavelength range of the color light emitted by the solid light source.

4. The projector according to claim 2, wherein
the light source optical system obtains color light having a predetermined color by causing the color light emitted by the solid light source to abut against a phosphor and generates the other color light by spectrally dividing the obtained color light having the predetermined color.

5. The projector according to claim 1, wherein
the first color system is an RGB color system,
the second color system is an XYZ color system; and
the camera outputs a measurement value of each color of R, G, and B constituting the RGB color system and outputs a measurement value of at least one color of X, Y, and Z constituting the XYZ color system.

6. The projector according to claim 1, wherein
the first color system is an RGB color system,
the second color system is an XYZ color system, and
the camera outputs a measurement value of each color of R and G constituting the RGB color system and Z constituting the XYZ color system.

7. A color correction system comprising:
a projector
a projection optical system configured to project image light onto a projection surface based on image data, and
a camera that measures a color of the image light forming an image on the projection surface, in terms of a plurality of colors constituting a first color system and at least one of colors constituting a second color system; and
one or more processors programmed to:
generate a correction parameter based on a conversion value and a second measurement value of the color, which is measured by the camera among the colors constituting the second color system, the conversion value being obtained by converting a first measurement value of the color in the first color system, which is measured by the camera, into the color in the second color system; wherein
the one or more processors are programmed to correct the image light with the correction parameter;
wherein the camera includes a light receiving element and an optical filter that changes light receiving characteristics of the light receiving element,
light which is not transmitted through the optical filter is received by the light receiving element, and the first measurement value of the color constituting the first color system is output, and
light transmitted through the optical filter is received by the light receiving element and the second measurement value of the color constituting the second color s stem is output.

8. A control method for a projector that projects image light onto a projection surface based on image data, the control method comprising:
measuring a color of an image formed on the projection surface by the image light in terms of a plurality of colors constituting a first color system and at least one of colors constituting a second color system, by a camera;
generating a correction parameter based on a conversion value and a second measurement value of the color; which is measured by the camera measurement unit among the colors constituting the second color system, the conversion value being obtained by converting a first measurement value of the color in the first color system into the color in the second color system; and
correcting the image light with the correction parameter;
wherein the camera includes a light receiving element and an optical filter a changes light receiving characteristics of the light receiving element,
light which is not transmitted through the optical filter is received by the light receiving element, and the first measurement value of the color constituting the first color system is output, and
light transmitted through the optical filter is received by the light receiving element, and the second measurement value of the color constituting the second color system is output.

* * * * *